(12) United States Patent
Utz

(10) Patent No.: US 12,239,043 B2
(45) Date of Patent: Mar. 4, 2025

(54) SEEDING APPARATUS

(71) Applicant: AGCO International GmbH, Neuhausen (CH)

(72) Inventor: Johannes Utz, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 703 days.

(21) Appl. No.: 17/594,703

(22) PCT Filed: May 4, 2020

(86) PCT No.: PCT/EP2020/062292
§ 371 (c)(1),
(2) Date: Oct. 26, 2021

(87) PCT Pub. No.: WO2020/239364
PCT Pub. Date: Dec. 3, 2020

(65) Prior Publication Data
US 2022/0201927 A1 Jun. 30, 2022

(30) Foreign Application Priority Data
May 30, 2019 (GB) ..................................... 1907634

(51) Int. Cl.
*A01C 7/20* (2006.01)
*A01C 7/08* (2006.01)
(52) U.S. Cl.
CPC ................ *A01C 7/203* (2013.01); *A01C 7/08* (2013.01); *A01C 7/208* (2013.01)

(58) Field of Classification Search
CPC ...... A01C 7/20–203; A01C 7/208; A01C 7/08
See application file for complete search history.

(56) References Cited

U.S. PATENT DOCUMENTS

| 2008/0276847 A1 | 11/2008 | Forchino |
| 2014/0048296 A1 | 2/2014 | Bassett |
| 2018/0338413 A1 | 11/2018 | Connell et al. |

FOREIGN PATENT DOCUMENTS

| CN | 205623193 U | 10/2016 |
| CN | 207167016 U | 4/2018 |
| CN | 207476172 U | 6/2018 |
| WO | 2018/054626 A1 | 3/2018 |

OTHER PUBLICATIONS

UK Intellectual Property Office, Search Report for priority Application No. GB 1907634.8, dated Nov. 22, 2019.
European Patent Office, International Search Report for related International Patent Application No. PCT/EP2020/062292, mail date Aug. 6, 2020.

*Primary Examiner* — Tara Mayo

(57) ABSTRACT

A seeding apparatus includes a frame supported on ground-engaging wheels, an opening device for creating a trench, a seed reservoir, and seed dispensing apparatus configured to deposit seed in the trench. The opening device is mounted to the frame by a four-bar linkage having first and second link arms. Each of the first and second link arms is pivotably connected to the frame by respective first and second pivot joints, and to the opening device by respective third and fourth pivot joints disposed forwardly of the first and second pivot joints. The opening device is 'pushed' through the soil via the four-bar linkage.

11 Claims, 14 Drawing Sheets

SEEDING APPARATUS

CROSS-REFERENCE TO RELATED APPLICATIONS

This application is a national phase entry under 35 U.S.C. § 371 of International Patent Application PCT/EP2020/062292, filed May 4, 2020, designating the United States of America and published in English as International Patent Publication WO 2020/239364 A1 on Dec. 3, 2020, which claims the benefit of and priority from United Kingdom Application No. 1907634.8, filed May 30, 2019, the entire disclosure of which is hereby incorporated by reference.

TECHNICAL FIELD

This disclosure relates to a seeding apparatus that has a frame, an opening device for creating a trench, a seed reservoir, a seed dispensing apparatus configured to deposit seed in the trench, and ground-engaging means.

BACKGROUND

Ensuring food supply is the main challenge for the future of human life on planet earth. To reach for a sustainable and sufficient food supply, current agricultural production systems and methods will need to go through radical changes. Arable land is limited: its effective, sustainable use is mandatory, especially as competition for use (as food, feed, fuel, and fiber) grows. High production costs provoke high food prices, especially critical for poor countries, and inaccurate use of seeds and agrochemicals results in high production costs and wasted resources.

Precision farming (the accurate use of resources down to the plant as the smallest individual unit) is a necessary measure to approach the mentioned challenges, but this is hard to achieve with large-scale equipment (from a technical perspective as well as an economical perspective) and soil damage cannot substantially be reduced on heavy equipment due to the laws of growth (3D mass versus 2D contact area).

The answer to some of these issues is small automated driverless vehicles (robots), also known as autonomous agricultural machines (AAM's) able to operate around the clock without human surveillance. International Patent Publication WO 2018/054626 A1, "Self-Propelled Seed Planter," published Mar. 29, 2018, the entire disclosure of which is incorporated herein by reference, discloses an AAM having a chassis propelled by four motorized wheels powered by an on-board battery pack. A drive control and guidance system controls propulsion of the vehicle. A seed reservoir carried by the chassis is in communication with a seed sorting and placement unit that dispenses seed to the ground.

One known issue with autonomous seeders is the difficulty in achieving sufficient downforce for an opening device to create a trench of sufficient depth, due to lack of sufficient weight in the overall machine. Application of too much downforce reduces the weight carried on the ground-engaging wheels to an extent that traction is lost or is insufficient.

BRIEF SUMMARY

In some embodiments, seeding apparatus includes a frame supported on ground-engaging wheels, an opening device for creating a trench, a seed reservoir, and a seed dispensing apparatus configured to deposit seed in the trench. The opening device is mounted to the frame by a four-bar linkage having first and second link arms. Each of the first and second link arms is pivotably connected to the frame by respective first and second pivot joints, and to the opening device by respective third and fourth pivot joints disposed forward of the first and second pivot joints.

The seeding apparatus may be an autonomous seeding robot.

Opening devices of conventional agricultural seeders towed by or mounted to tractors are carried by 'trailing' four-bar linkage arrangements in which the opening device trails the connection point to the frame, and active downforce application is required to push the opening device into the ground using the weight of the machine. This trailing arrangement has been naturally adopted by known autonomous seeders but suffers from the aforementioned issue caused by insufficient downforce from the lightweight nature of seeding robots.

An opening device is mounted to a frame so that the opening device 'leads' the connection to the frame during a seeding operation. Advantageously, the downforce is thereby derived from the horizontal force generated by the driven ground-engaging wheels as the opening device is 'pushed' through the four-bar linkage. As a result, better traction is achieved without compromising downforce and without a requirement for additional machine weight.

The seeding apparatus may include a depth-control stop mounted to the frame and configured to contact and limit downward travel of the opening device. The depth control stop serves to prevent the opening device from digging too deep into the ground. The position of the depth-control stop may be adjustable with respect to the frame and may have an associated actuator to automatically or remotely control the depth of the opening device.

In one embodiment, the opening device has a support structure and a pair of mutually angled coulters rotatably mounted thereto. The first and second link arms are connected to the support structure by the third and fourth pivot joints, respectively. The support structure serves as coupler link and maintains a fixed distance between the third and fourth pivot joints. In alternative embodiments, the coulters may be replaced by other means suitable for creating a trench or drill, such as a spring-tine or chisel-type device.

The seeding apparatus may also include a lift actuator connected between the frame and the first link arm. The lift actuator is operable to raise and lower the opening device. The lift actuator is preferably an electric stepper motor.

In some embodiments, the lift actuator is coupled between the frame and the four-bar linkage such that extension of the lift actuator raises the opening device. In such an arrangement, the lift actuator may be connected to the first link arm at a position intermediate the first and third pivot joints. In an alternative arrangement, the lift actuator is connected to an extension portion of the first link arm. The first pivot joint resides intermediate the lift actuator and the opening device so that retraction of the lift actuator raises the opening device.

The lift actuator may be connected to the first link arm by a yieldable downforce regulating device. In one such embodiment, the downforce regulating device comprises a spring inside a spring housing. The spring is configured to act between the spring housing and the lift actuator, the spring housing is fixedly connected to the first link arm, and the lift arm is operable to compress the spring when downward travel of the opening device is restricted. The spring acts in compression to provide an element of 'give' which allows the opening device to ride over stones or hard ground.

The amount of compression in the spring is proportional to the downforce exerted on the opening device and this in turn is controlled by the lift actuator.

BRIEF DESCRIPTION OF THE DRAWINGS

Further advantages will become apparent from reading the following description of specific embodiments with reference to the appended drawings in which.

DETAILED DESCRIPTION

While the disclosure will be described in connection with these drawings, there is no intent to limit to the embodiment or embodiments disclosed herein. Although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Architecture and Frame

Figure 1:
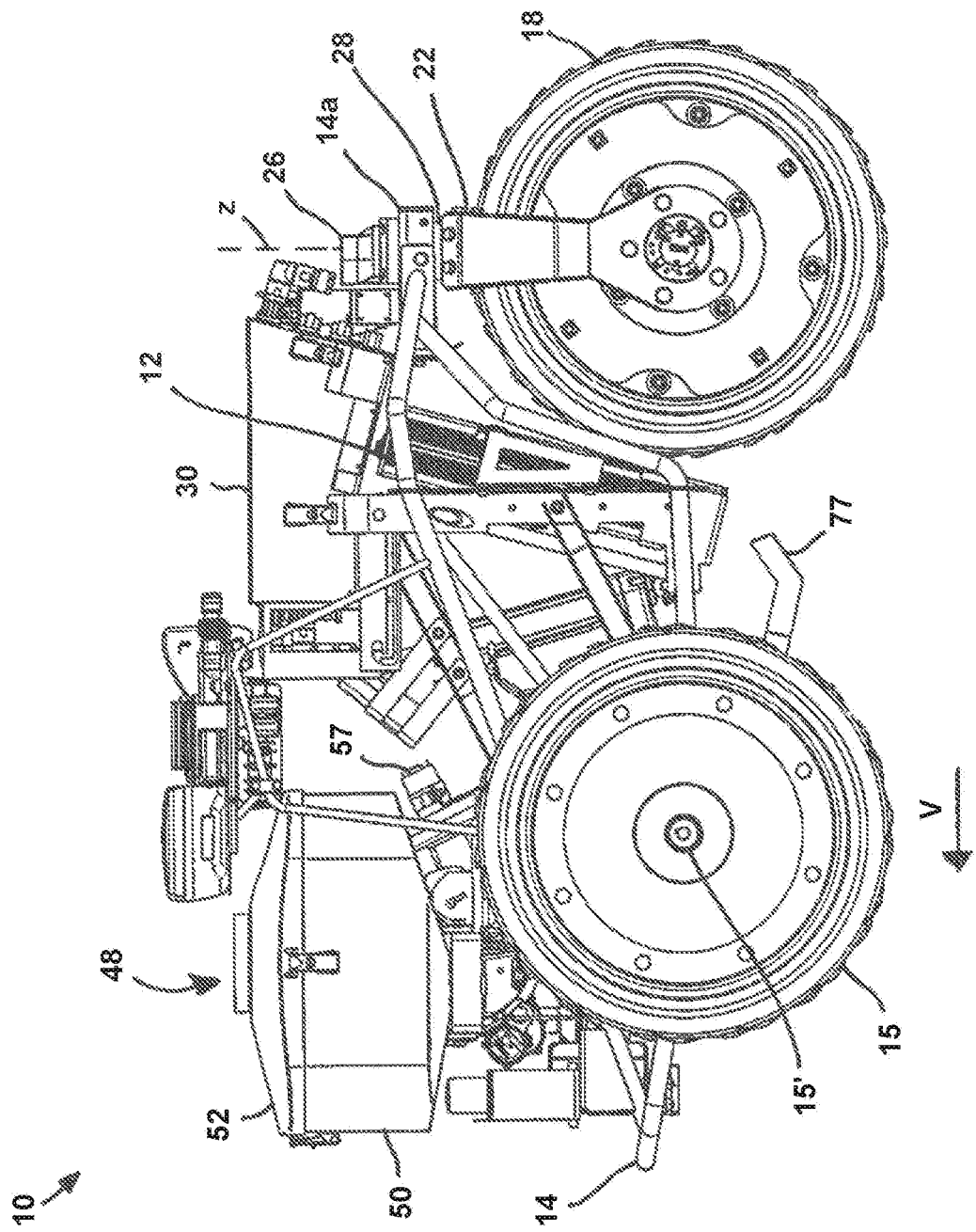
FIG. 1 is a left side view of a seeding robot in accordance with an embodiment.
Figure 2:
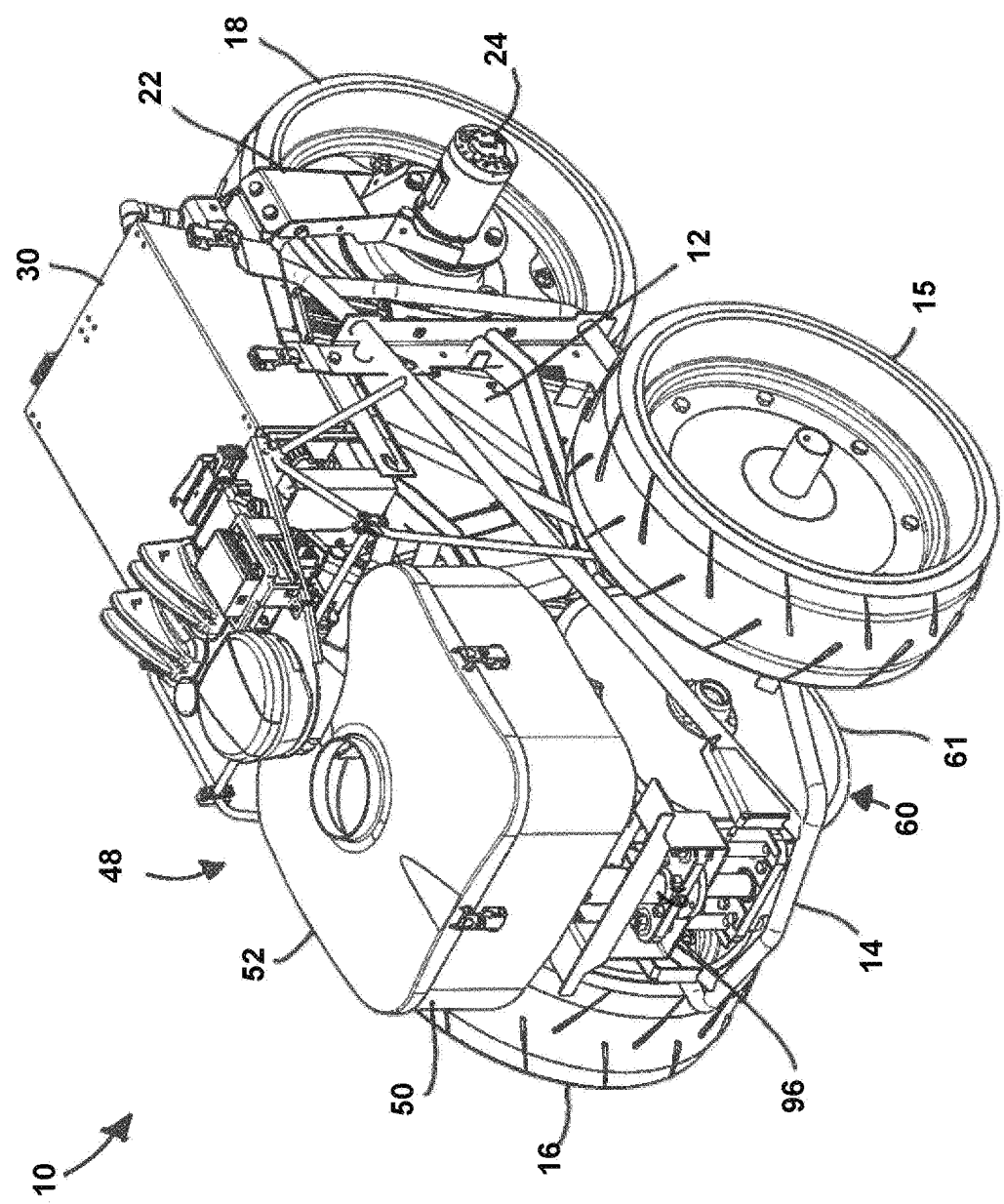
FIG. 2 is a front-left perspective view of the seeding robot of FIG. 1.
Figure 3:
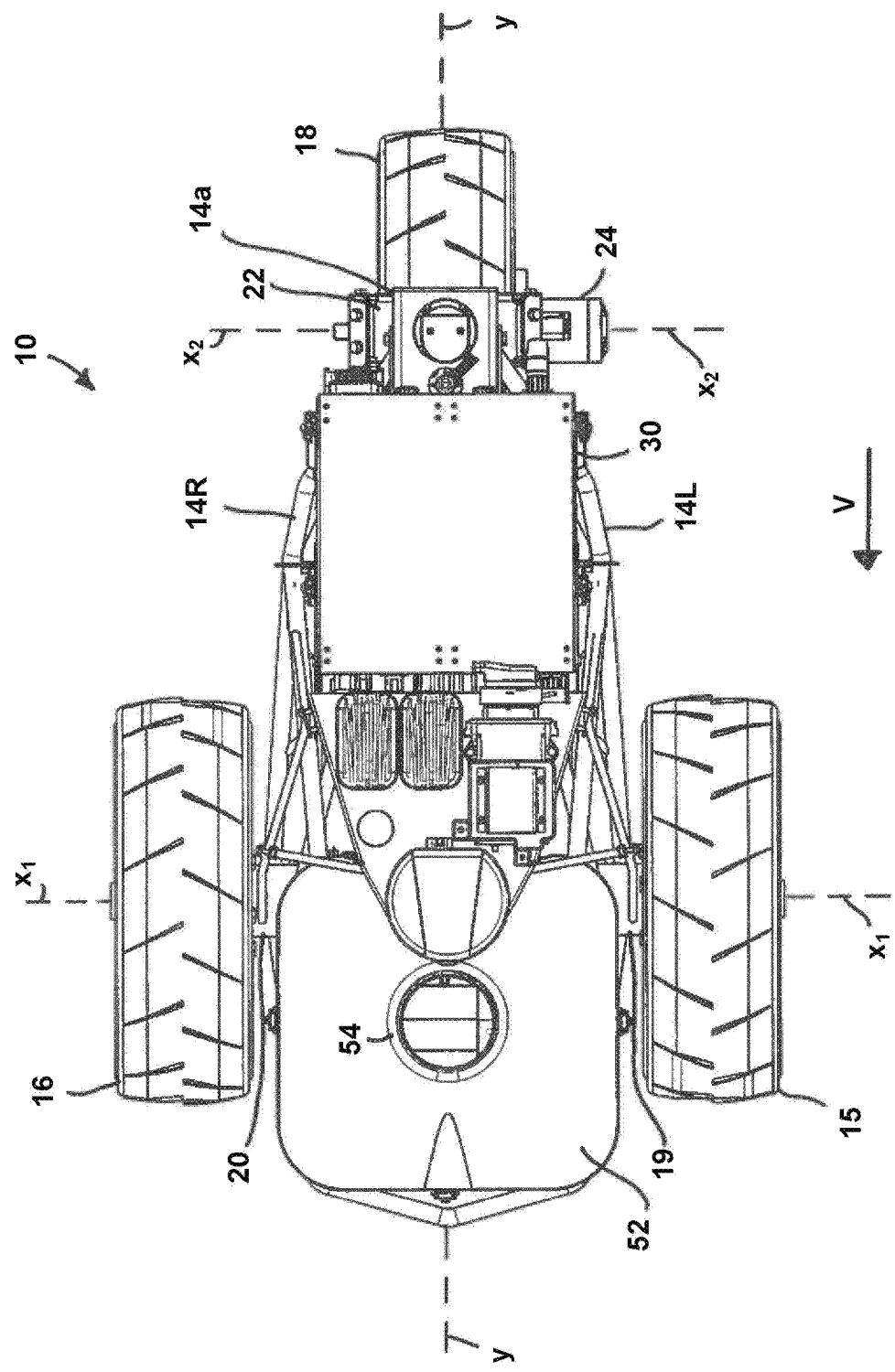
FIG. 3 is a top view of the seeding robot of FIG. 1.

With reference to FIGS. 1, 2, and 3, an autonomous seeding robot 10 includes a power supply in the form of a battery 12 mounted on a frame 14 supported on ground-engaging wheels. The robot 10 is operable in a forward direction of travel indicated by arrow V and includes a pair of leading wheels 15, 16 and a single, steerable, trailing wheel 18 positioned behind the leading wheels 15, 16 with respect to the forward direction of travel V.

The leading wheels 15, 16 share a common rotation axis $x_1$, but are mounted independently to the frame 14 on separate hubs 15', 16'. Each hub 15', 16' is driven by a respective electric drive motor 19, 20, which ultimately derives power from the battery 12. Each leading wheel 15, 16 can thus be driven independently to assist or even facilitate steering.

The trailing wheel 18 is steerable about and upright a steering axis z, and is carried on a steering fork 22 which is rotatably mounted to the frame 14 about the steering axis z. A hub 18' of trailing wheel 18 is rotatably mounted to the steering fork 22 to permit rotation on axis $x_2$. An electric drive motor 24 serves to drive the trailing wheel 18 and is ultimately powered by battery 12.

The wheels 15, 16, 18 each include a tire, which may have a herringbone tread pattern for example. Although all three wheels 15, 16, 18 are shown and described as being powered, one or more wheels may be unpowered.

A steering control motor 26 is mounted in front of and parallel to the steering axis z above the steering fork 22 and is coupled to an upright kingpin 28 fixed to the steering fork 22 via spur gears (not shown) for controlling rotation thereof. Advantageously, the mounting of the single steerable wheel 18 in this manner allows a 360° turning angle around the steering axis z, thus delivering a highly maneuverable machine which can turn more or less on-the-spot. Furthermore, the three-wheeled arrangement of the robot 10 provides for a stable structure with a lower part count than four-wheeled machines.

The architecture of frame 14 provides an open structure for accommodating seed dispensing apparatus and an opening device which will described in more detail below. An outer part of frame 14 is constructed from tubular members which provide left and right side structures 14L, 14R (FIG. 3) which taper outwardly in the forward direction from a trailing wheel support portion 14a. The battery 12, seed dispensing apparatus, and opening device are accommodated between the left and right side structures 14L, 14R. The leading wheels 15, 16 are carried outside of the left and right side structures 14L, 14R.

The battery 12 is carried between the left and right side structures 14L, 14R in a manner so that its shortest dimension is aligned generally fore-and-aft, so that it can be carried between the leading wheels 15, 16 and trailing wheel 18 and lower the machine center of gravity.

Control Systems

An electric control unit (ECU) 30 sits atop the frame 14 above the battery 12 and houses a CPU 32, a steering control system, power electronics, and control electronics for the wheel motors 19, 20, 24.

The battery 12 is preferably operable at 48 volts and has a capacity in the range of 1.8 to 2.6 kwh for example. A charging module and battery control system are integrated in the ECU 30. While not shown, the charging module also contains a charging connector which can be brought into connection with off-board means for charging by automated plug-in. Alternatively, the battery 12 may be exchangeable as a whole by respective battery changing means.

Figure 4:
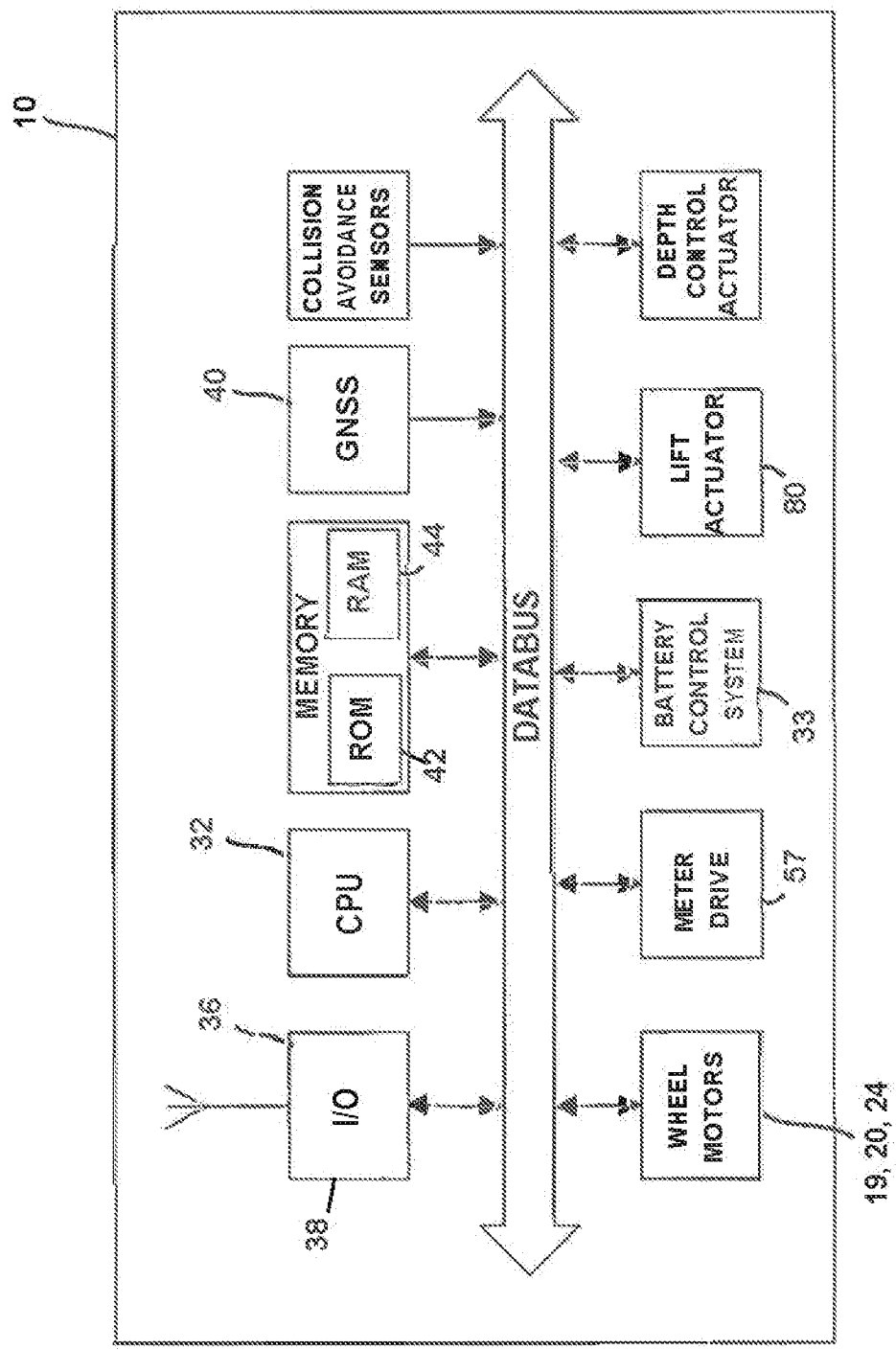
FIG. 4 is a block diagram of certain components and systems of the seeding robot of FIG. 1.

The control systems of the seeding robot 10 are illustrated schematically in FIG. 4 and include, inter alia, CPU 32. The CPU 32 may be a custom made or commercially available processor, an auxiliary processor among several processors (although simplicity in component numbers is desirable for AAM), a semi-conductor micro-processor (in the form of a microchip), a macro processor, one or more application specific integrated circuits (ASICS), a plurality of suitably configured digital logic gates, and/or other well-known electrical configurations comprising discrete elements both individually and in various combinations to coordinate the overall operation of the electronic control unit 30.

The CPU 32 is coupled via an address and data bus 34 to I/O interface 36 to an aerial 38, which provides one or more interfaces to a remote network or control system for a cluster or swarm of seeding robots 10. Additionally (although an additional aerial or antenna array may be used), this provides input for positioning data, for example Global Positioning System (GPS) or Global Navigation Satellite System (GNSS) data which is resolved in an on-board positioning system 40 to identify the current location of the AAM 10.

Additionally coupled to the CPU 32 via data bus 34 are onboard storage devices represented by read-only (ROM) and random-access (RAM) devices 42, 44. The ROM 42 suitably carries the boot-up and general operational software for the AAM (for example in terms of routines to be followed when deviation from a pre-planned path is necessitated by an encountered obstruction), and the RAM 44 captures transitory data such as the location of obstacles encountered (location determined by guidance/positioning system 40) and the actual location of seeds planted/deposited—for example where this departs from a pre-planned positioning due to environmental conditions and/or issues with the operation of the AAM.

When certain embodiments of the control systems are implemented at least in part as software (including firmware), it should be noted that alternatively or in addition to ROM 42, the software can be stored on a variety of non-transitory computer-readable medium for use by, or in connection with, a variety of computer-related systems or methods. In the context of this document, a computer-readable medium may include an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device, and execute the instructions.

When certain embodiments of the control systems are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In addition to the above-mentioned capture of AAM positional data, the AAM 10 may be provided with additional sensors to capture further operational machine information (e.g., tilt/yaw variations from horizontal, machine performance, battery usage etc.) which may be stored locally by the CPU 32 in memory 44 and made available by transmission via aerial 38 (if the device is configured also to transmit), or transferred via memory device, such as a memory stick, plugged into the AAM by the operator, or stored remotely and accessed, such as from a data structure (e.g., database) upon operator request or automatically upon detection of an event (e.g. conditions indicating failure of an individual AAM of a cluster).

Output from the CPU 32 provides a controlled drive signal to the three individual wheel drive motors 19, 20, 24, or such other drivetrain mechanism as the AAM may have (e.g. independently controllable tracks instead of wheels) as well as to the meter drive motor 57, which will be described in further detail below.

Opening and Seed Dispensing Apparatus

Returning to FIGS. 1 through 3, the robot 10 includes a seeding unit 48 that has several components to handle the seeds. A seed reservoir 50 is preferably fabricated from molded plastic with a removable lid 52 having a filler hole 54 formed therein. The seed reservoir 50 receives seeds to be planted or placed. As will be understood in the context of an AAM, replenishing the reservoir may be an autonomous activity triggered when the reservoir is low/empty, with the AAM leaving its current planned planting path to go to a host vehicle at the side of the field from which the reservoir may be replenished, before returning to the planned task. Alternatively the reservoir 50 may be filled by hand as a manual task.

Hidden from view in FIGS. 1 through 3, but shown in FIG. 7A, the seeding unit 48 has a seeding meter 55 mounted below the seed reservoir 50 and in communication therewith so that seeds drop by gravity from the reservoir 50 into the meter 55. The seeding meter 55 takes seeds from the reservoir 50 and, and in a known fashion, separates them and outputs them as a sequence of individual seeds into a downwardly directed seed delivery chute 56. In one embodiment, the seeding meter is a meter manufactured by Precision Planting LLC, of Tremont, Illinois, and branded 'vSet'. The seeding meter 55 is driven by an electrical meter drive motor 57 which is controlled by the CPU 32 via databus 34.

The seeding unit 48 has an opening device indicated generally at 60. The opening device 60 serves the same function as openers provided in conventional seeders and planters, and is operable to create a trench in the soil in which the metered seeds are deposited. The opening device 60 has a pair of mutually-angled coulters rotatably mounted to an opener support 62. The coulters 61 are angled in a known manner so as to force open a trench as they are conveyed through the soil. Although described and shown as coulters 61, the opening device may include other known trench opening elements such as spring tines or chisel-like devices.

In some embodiments, the seeding unit 48 and especially the opening device 60 is mounted to the frame 14 by a four-bar linkage 64 configured so that the opening device 60 is pushed from behind with reference to the forward direction of travel V, which is contrast to known row unit suspension assemblies for seeders, which pull the opening device. The four-bar linkage 64 has an upper link 66 and a lower link 68.

In the illustrated embodiment, the seeding unit 48 (including reservoir 50 and seeding meter 55) is movable by the four-bar linkage 64 to move with opening device 60. This places further weight on the opening device 60 and helps to smooth the ride. In an alternative embodiment, seed reservoir 50 and seeding meter 55 are fixed to frame 14 with a flexible seed delivery chute, enabling relative movement between seed meter 55 and dispense point 99.

Figure 7A:
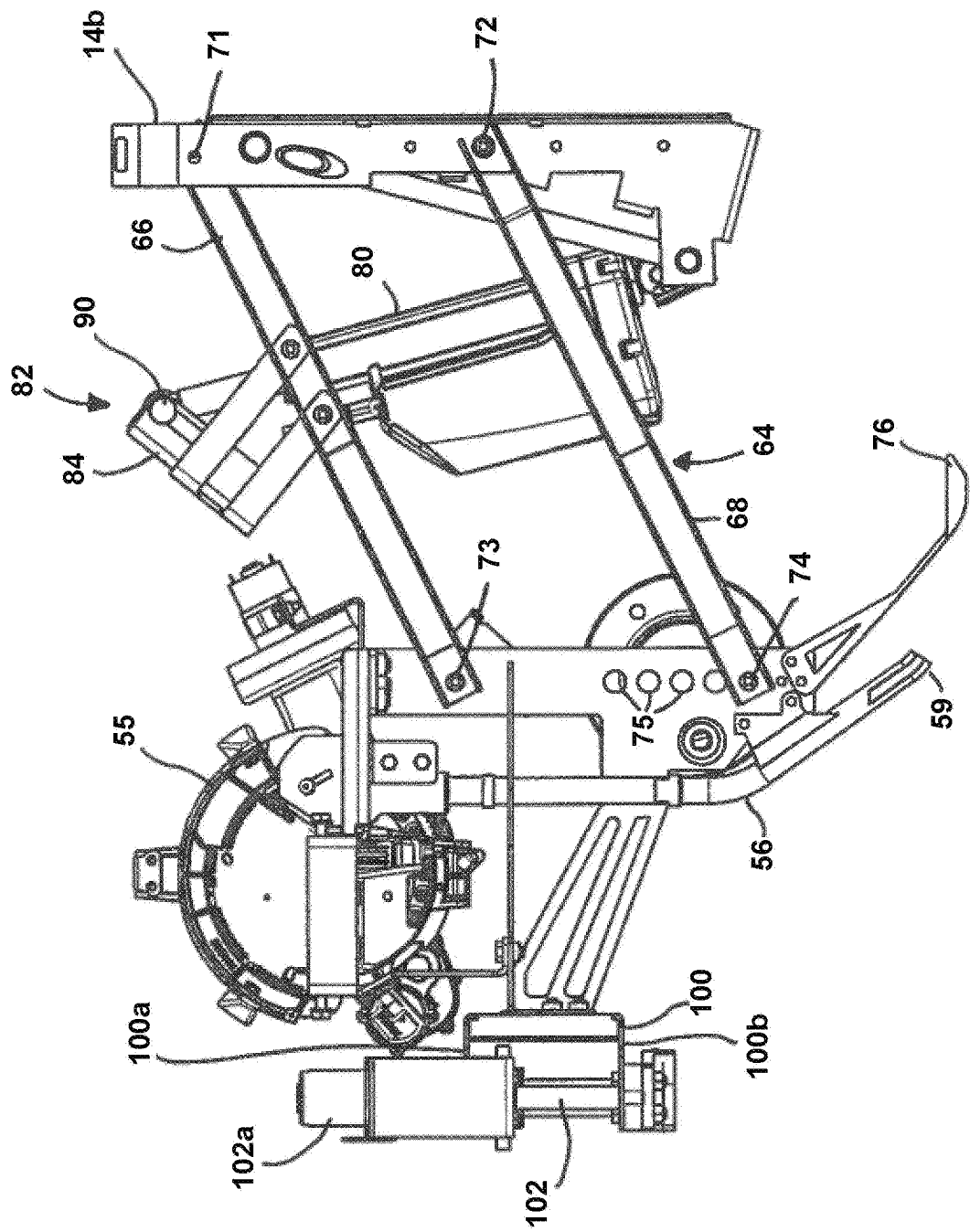
FIG. 7A is a left side view of part of the seeding robot of FIG. 1 showing, inter alia, the opening device, four-bar linkage and lift actuator.

Best viewed in FIG. 7A, the upper link arm 66 is pivotally connected to upright frame portion 14b by a first pivot joint 71. Similarly, the lower link arm 68 is pivotally connected to the frame portion 14b by a second pivot joint 72 below the first pivot joint 71 in a spaced relationship. A forward end of the upper link 66 is pivotally connected to the opening device support structure 62 by a third pivot joint 73. A forward end of the lower link arm 64 is pivotally connected to the opening device structure 62 by a fourth pivot joint 74 below the third pivot joint 73 in a spaced relationship.

Together, the upright frame portion 14b, opening device support structure 62, and upper and lower link arms 66, 68 form the four-bar linkage 64 connected by pivot joints 71 through 74. The pivot joints 71 through 74 pivot about horizontal axes so that movement freedom provided by the four-bar linkage 64 allows the opening device to be generally raised and lowered.

As seen in FIG. 7A, the opener support 62 may have a plurality of alternative holes 75 to which the forward end of lower link 64 can be connected to form the fourth pivot joint 74. This permits the 'angle of attack' of the opening device to be adjusted depending on the conditions.

Raising and lowering of the seeding unit and thereby the opening device 60 is controlled by a lift actuator 80 connected between the frame 14 and one of the upper and lower link arms 66, 68 (illustrated as connecting the upper link arm 66). The lift actuator 80 is powered electrically and extends to raise the seeding unit 48 and retracts to lower the seeding unit 48. The lift actuator 80 is electrically driven and self-locking in position, which is detected by an internal position sensor.

Seed is metered and deposited into the seed delivery chute 56 by the meter 55. The seed delivery chute 56 dispenses the seed from a discharge opening into the trench formed by the opening device 60. The point at which the seed is dispensed from the seed delivery chute will be referred to as the dispense point 59.

A seed firmer 76 is fixed to the opener support 62 for movement therewith and is positioned behind the opening device 60 and in front of the trailing wheel 18. The seed firmer 76 is operable to press the seed into the furrow after being released from the seed dispense point 59 and to prevent the seed from jumping or rolling in the furrow.

Figure 7B:
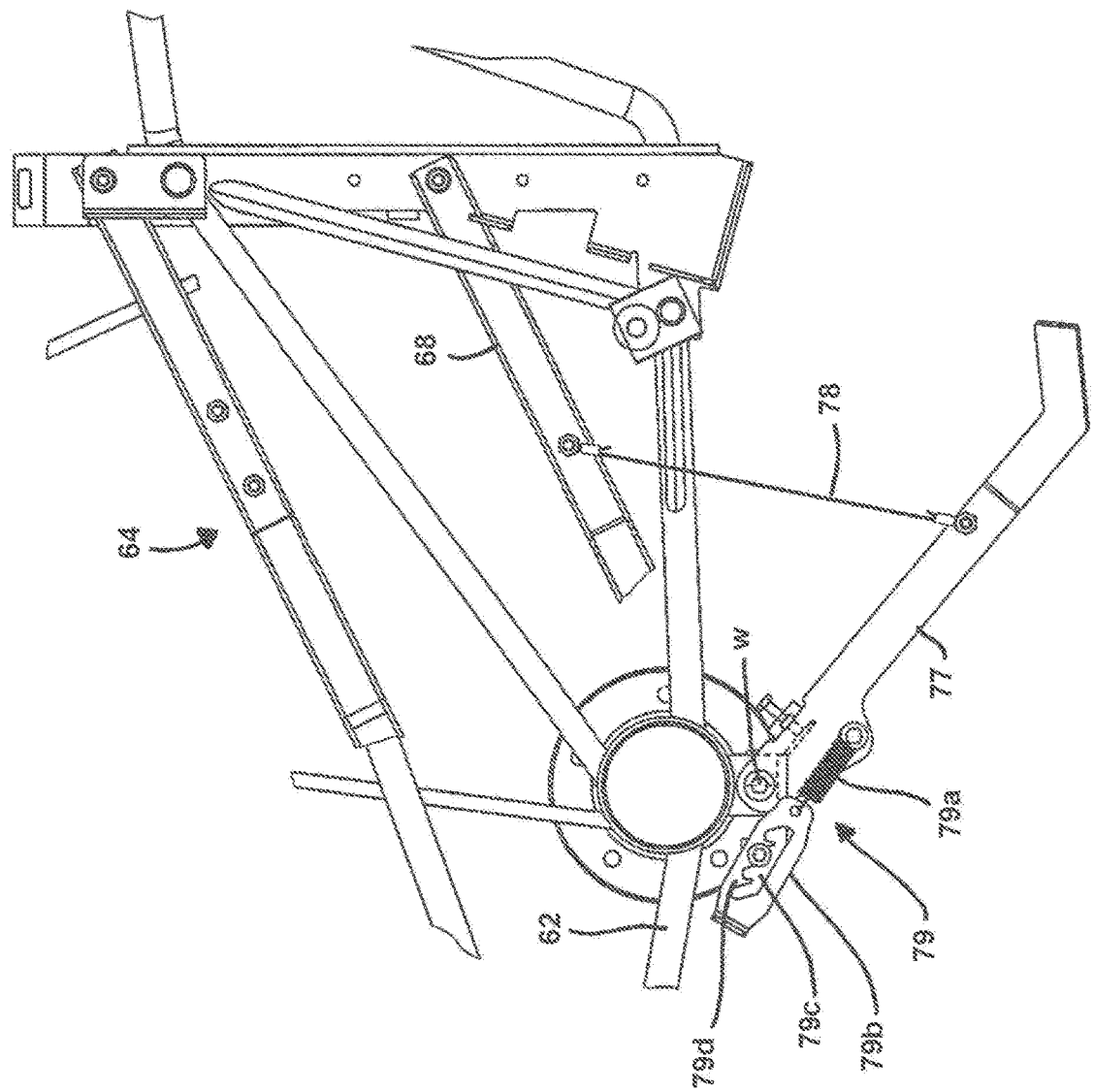
FIG. 7B is a left side view of part of the seeding robot of FIG. 1 showing, inter alia, the four-bar linkage and closing device 77.

An optional closing device 77 is fixed to the frame 18 on both sides and is positioned behind the opening device 60 and in front of the trailing wheel 18. The closing device 76 is operable to close the trench and cover the dispensed seed. As best seen in FIG. 7B (with opener support 62, seeding unit 48, depth control means 96, and lift actuator 80 omitted for clarity) the closing device 77 is pivotably attached to the frame 18 for rotation about axis 'w'. A wire rope 78 connects the closing device 77 to the lower link arms 68 (by screws) so that the closing device 77 is raised and lowered by the actuator 80. In addition, an adjustable spring bias means 79 is provided to apply a force in a downward direction upon the closing device 77. The spring bias means 79 includes a spring 79a connected to the closing device 77 and a catch part 79b with a recess 79c for connection with the opener support 62. The recess 79c provides three upwardly extending groves 79d that can be engaged with a screw fixed to the opener support 62. Depending on which of grooves 79d is engaged, the biasing force is changed.

Although shown as a simple blade fixed to the frame, the closing device 76 may alternatively comprise a tine for example.

Depth Control

With reference to FIGS. 8 through 10C, depth control means 96 consists of a generally u-shaped support element 100 connected to the opener support 62. A stepper motor arrangement 102 is attached to upper and lower legs 100a, 100b. The stepper motor arrangement 102 is self-locking in position, which is detected by an internal position sensor. A stop motor 102a and upper bearing 102b (see FIGS. 10A through 10O) of the stepper motor arrangement 102 are fixed to the upper leg 100a. The lower bearing 102c and the position sensor 102d are fixed to the lower leg 100b.

Figure 8:
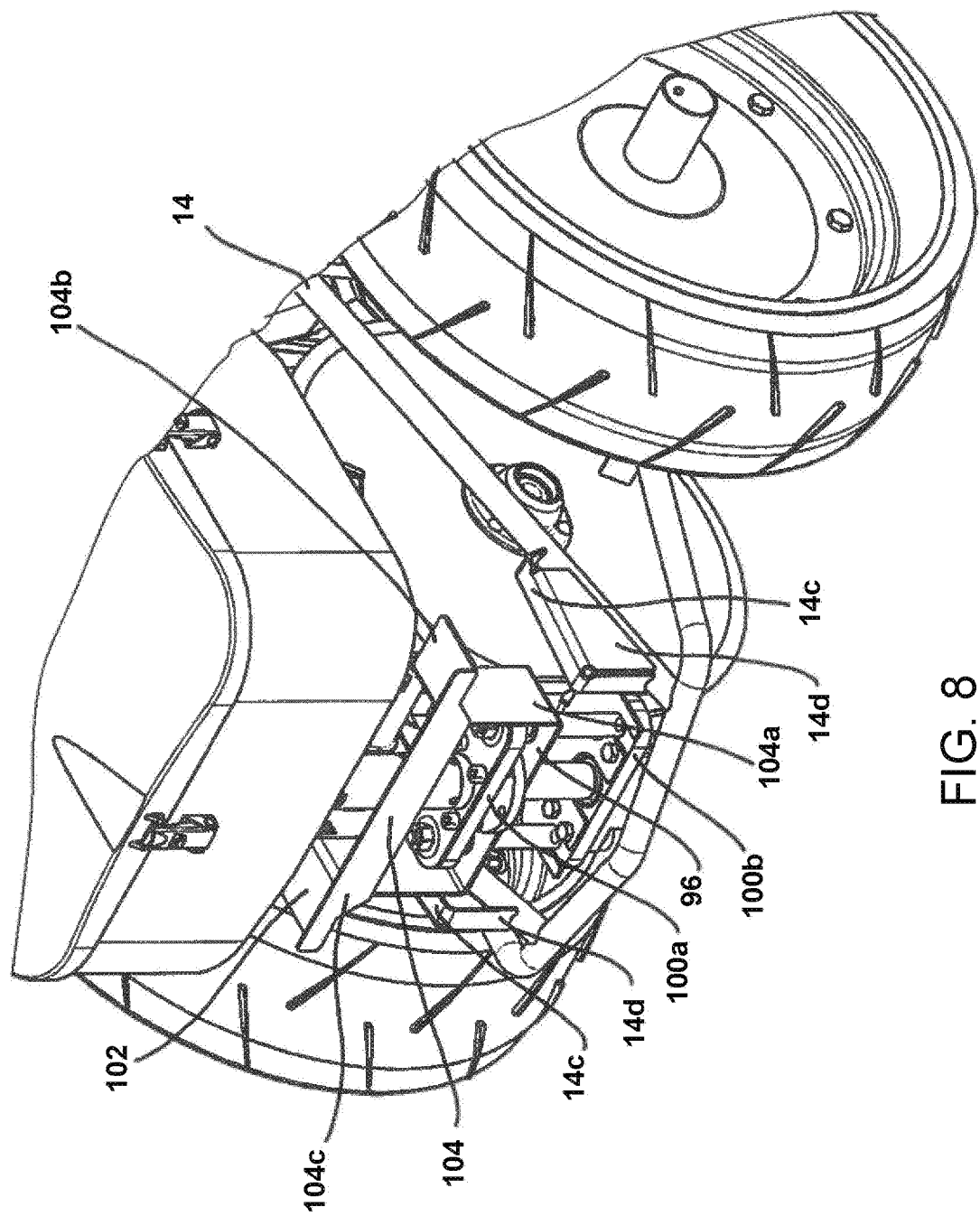
FIG. 8 is a detailed perspective view of the seeding robot of FIG. 2 showing details of the depth control.
Figure 9:
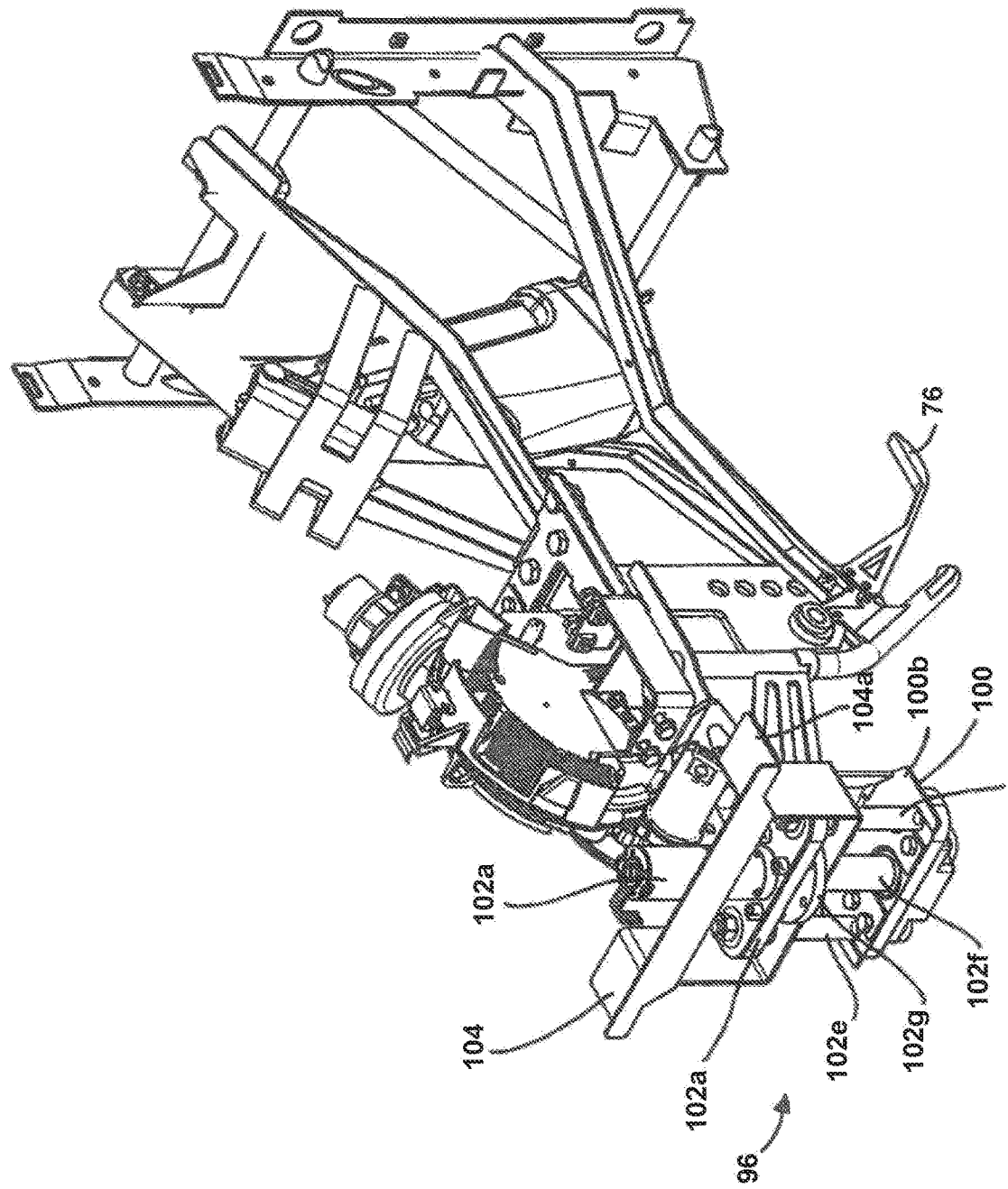
FIG. 9 is a perspective view of the seeding robot of FIG. 2 showing the depth control.

Two side guide rods 102e and a threaded central rod 102f are between the upper and lower legs 100a, 100b. The threaded central rod 102f is rotated by fixed connection to the stop motor 102a. A threaded nut part 102g screwed on the threaded central rod 102f is prohibited against rotation by connection to movable stop element 104. The threaded nut part 102g is fixed to the main body 104a by screws and bores (not shown in detail) in the main body 104a and is provided which slideable guide rods 102e. As a consequence, when threaded central rod 102f rotates, the threaded nut part 102g and thereby stop element 104 is torsion-locked and moves upward and downward between the upper and lower legs 100a, 100b of the u-shaped support element 100. With particular reference to FIG. 8, the stop element 104 (made of bended sheet metal parts) consists of integrally formed stop lugs 104b which are provided on both sides to contact with upwardly oriented stop contours 14c provided by stop frame portions 14d of the frame 14.

The stop element 104 further includes a reinforcing metal sheet 104c which connects both stop lugs 104a by welding to increase stiffness.

The design enables the actuator 80 to quickly raise or lower the four-bar linkage 64 and components of the seeding unit 48 while depth control means 96 adjusts working depth by the stepper motor arrangement 102, which is slow in movement but allows precise and position controlled movement of the stop element 104.

Figure 10A:
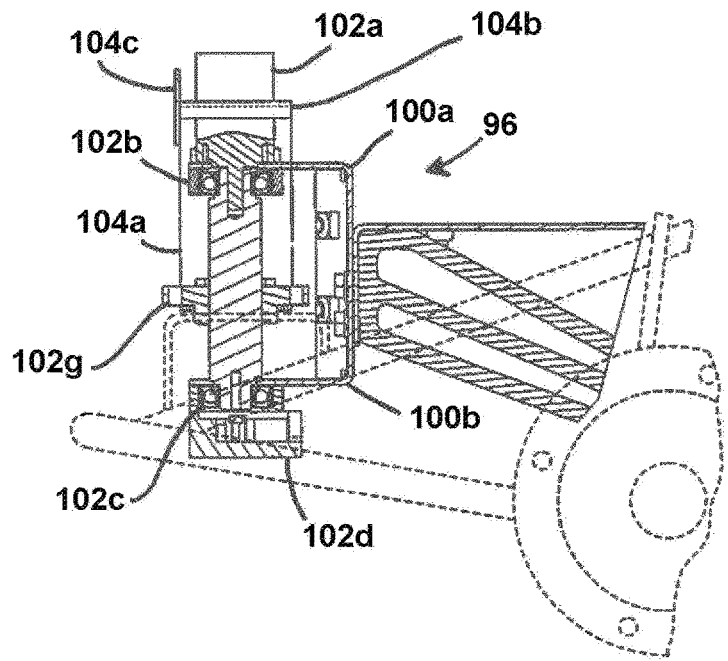
FIGS. 10A to 10C show left side views of a vertical section of the depth control stop.

FIGS. 10A through 10O depict the four-bar linkage 64 and depth control means 96 in relation to the frame 14 to further illustrate different example positions corresponding to different working conditions.

FIG. 10A shows a position in which the actuator 80 is fully extended to move the seeding unit 48 and opening device 60 into a raised position, generally referenced as a non-working position. The threaded nut part 102g and stop element 104 of the depth control means 96 is shown in a middle position (relative to upper and lower legs 100a, 100b). In this position, stop lugs 104b of the stop element 104 are spaced from upwardly oriented stop contours 14c provided by the stop frame portions 14d.

Figure 10B:
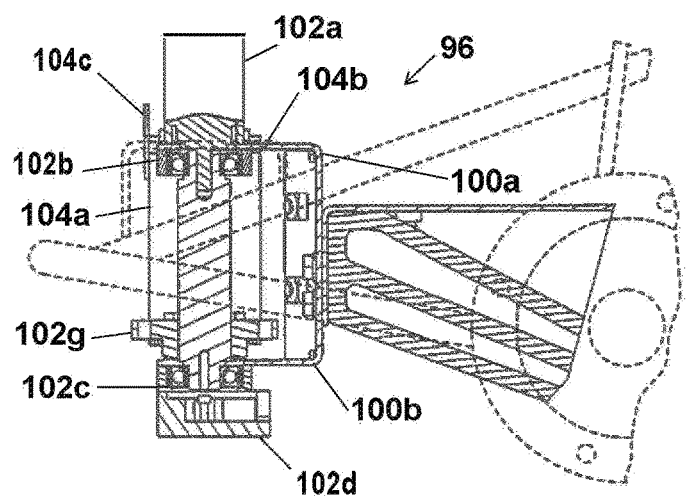
Figure 10C:
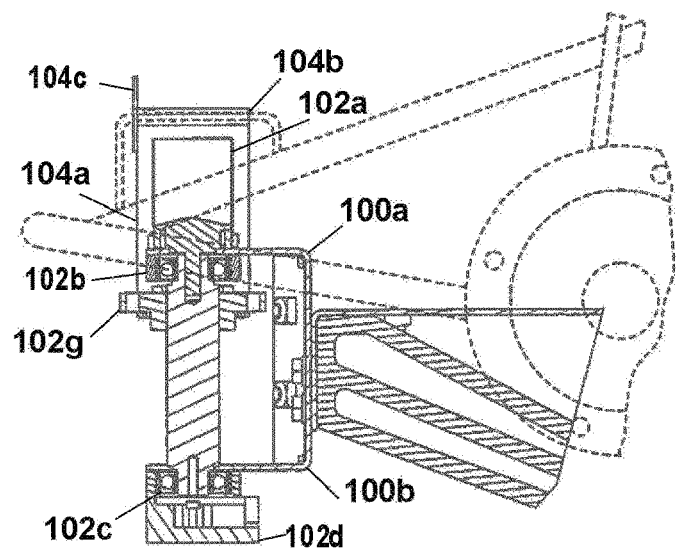
Figure 11A:
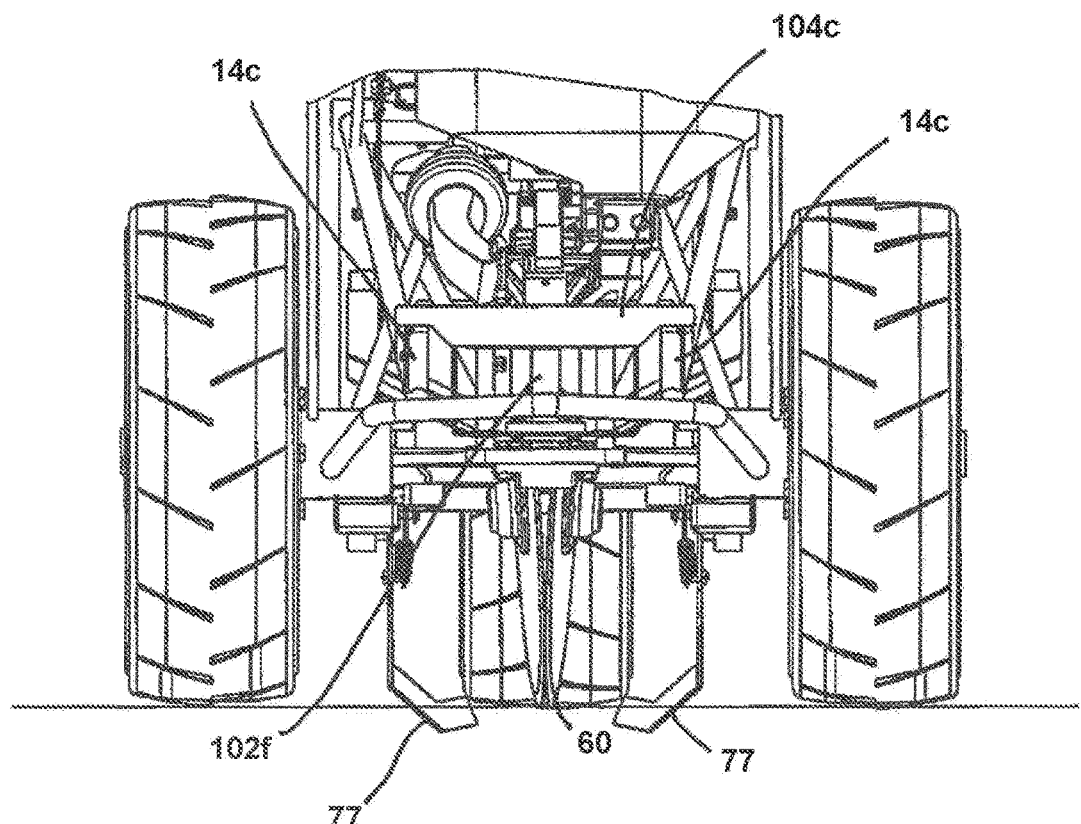
FIG. 11A shows a front view of the seeding robot of FIG. 1 in a raised position of the seeding unit.
Figure 11B:
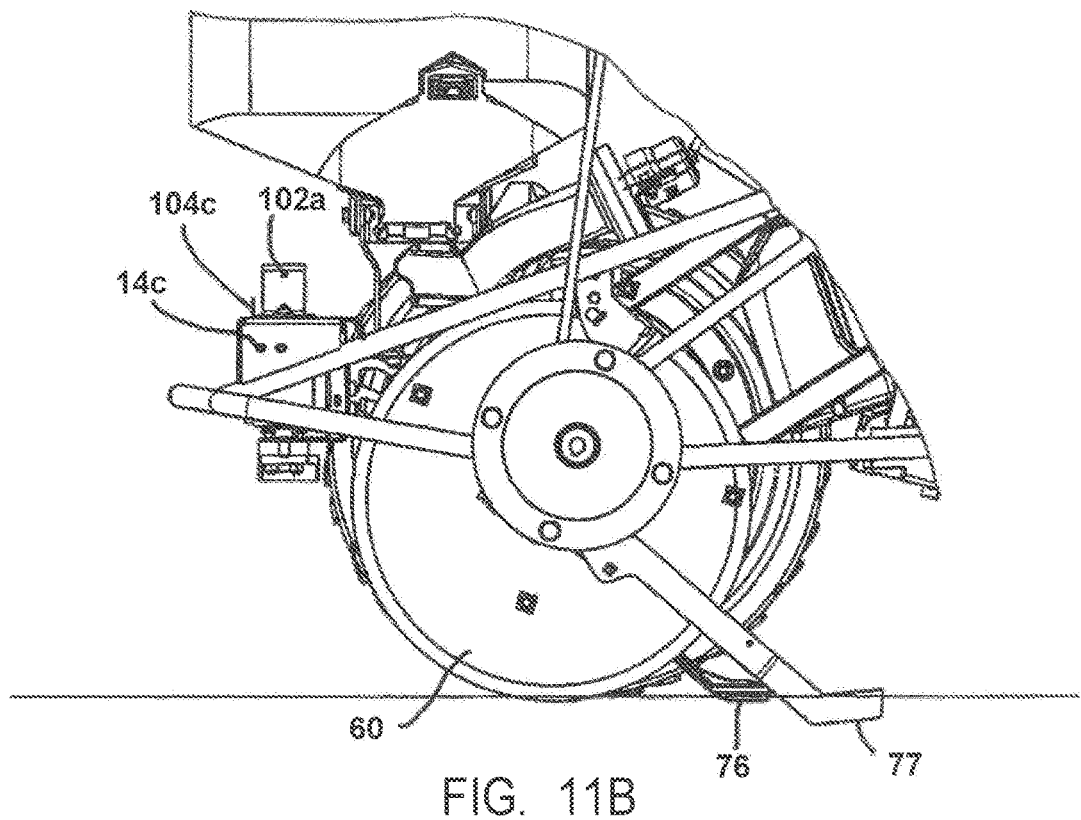
FIG. 11B shows a detailed left side view of the seeding robot of FIG. 1 in a raised position of the seeding unit.

With reference to FIGS. 10B, 11A and 11B, the seeding unit 48 is shown in a working position, wherein the actuator 80 is retracted until the stop lugs 104b of the stop element 104 contact the upwardly oriented stop contours 14c of the stop frame portions 14d. As actuator 80 is provided with the torque limitation integrated in the actuator control, movement of four-bar linkage 64 and thereby the seeding unit 48 would stop. The working depth then depends on the relative position of threaded nut part 102g (and the stop element 104) between the upper and lower legs 100a, 100b. In the position shown, a small working depth is adjusted as the threaded nut part 102g (and stop element 104) is in a bottom position close to lower legs 100b.

Figure 12A:
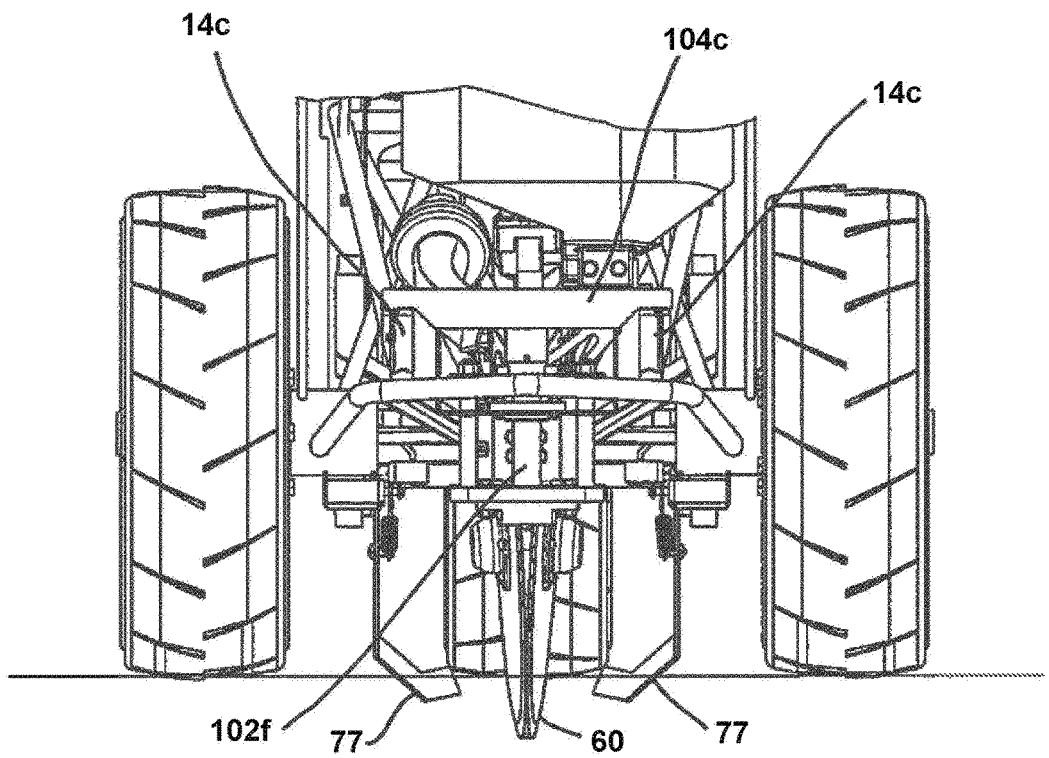
FIG. 12A shows a front view of the seeding robot of FIG. 1 in a lowered position of the seeding unit.
Figure 12B:
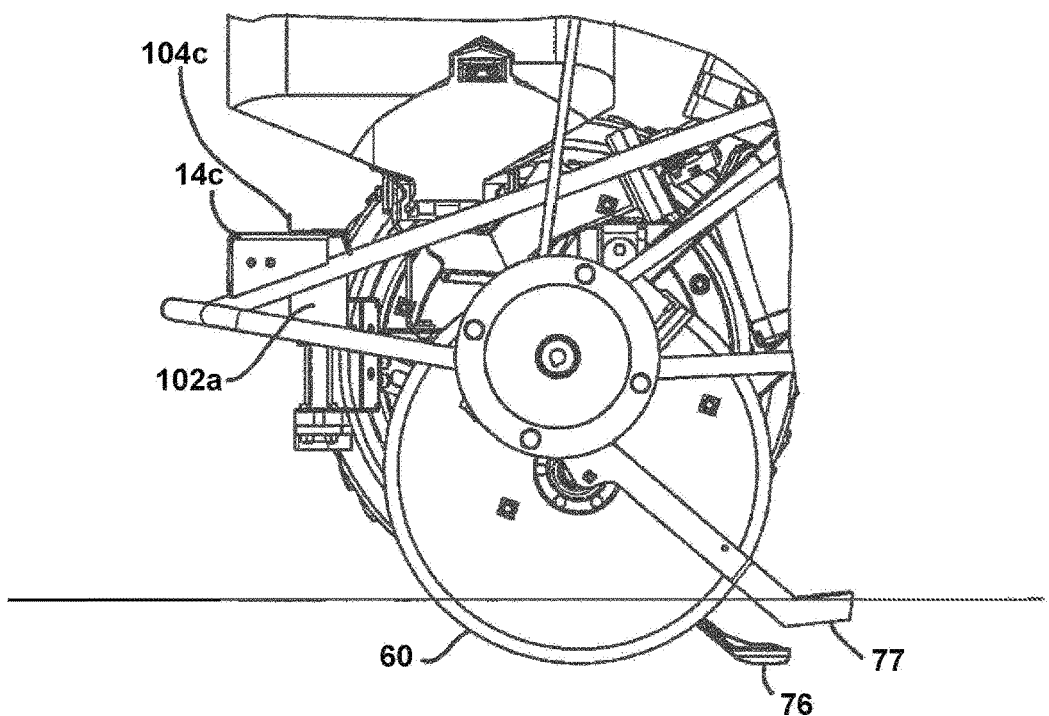
FIG. 12B shows a detailed left side view of the seeding robot of FIG. 1 in a lowered position of the seeding unit.

In FIGS. 10O, 12A, and 12B, the maximum working depth is adjusted as the threaded nut part 102g (and the stop element 104) is in a top position close to upper legs 100a.

The working depth adjustment can be provided by depth control means 96 prior to lowering of four-bar linkage 64 by actuator 80 from a non-working position or alternatively, when the seeding unit 48 is in working position. Moving the stop element 100 upward (relative to upper and lower legs 100a, 100b) during engagement of the seeding unit 48, especially opening device 60, causes the stop lugs 104b of the stop element 104 to move away from stop contours 14c of the frame 14. But due to the linkage design, the seeding unit 48 and opening device 60 is forced downward into ground by the kinematics so that the stop element 104 moves to contact the stop contours 14c again. As a result, working depth would be increased. On the other hand, moving the stop element 100 downward (relative to upper and lower legs 100a, 100b) during engagement of the seeding unit 48, especially opening device 60, causes the stepper motor arrangement 102 to force the stop element 104 against contours 14c so that the seeding unit 48 and opening device 60 move upward to reduce working depth.

Under ideal and constant soil conditions this would be enough to operate the robot 10 for seeding purposes.

Downforce Control

To cater for variations in soil conditions across a field, variable downforce control is provided.

Figure 13B:
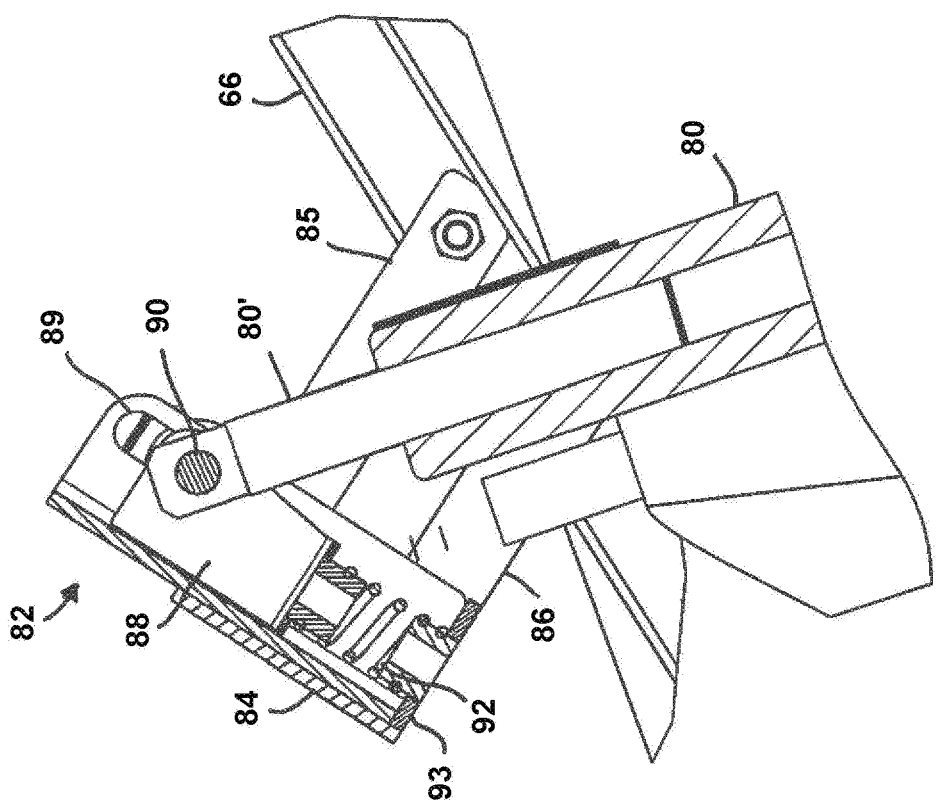
FIGS. 13A and 13B show left side views of a vertical section of the downforce regulating device and lift actuator corresponding to FIGS. 10A and 10B.
Figure 13A:
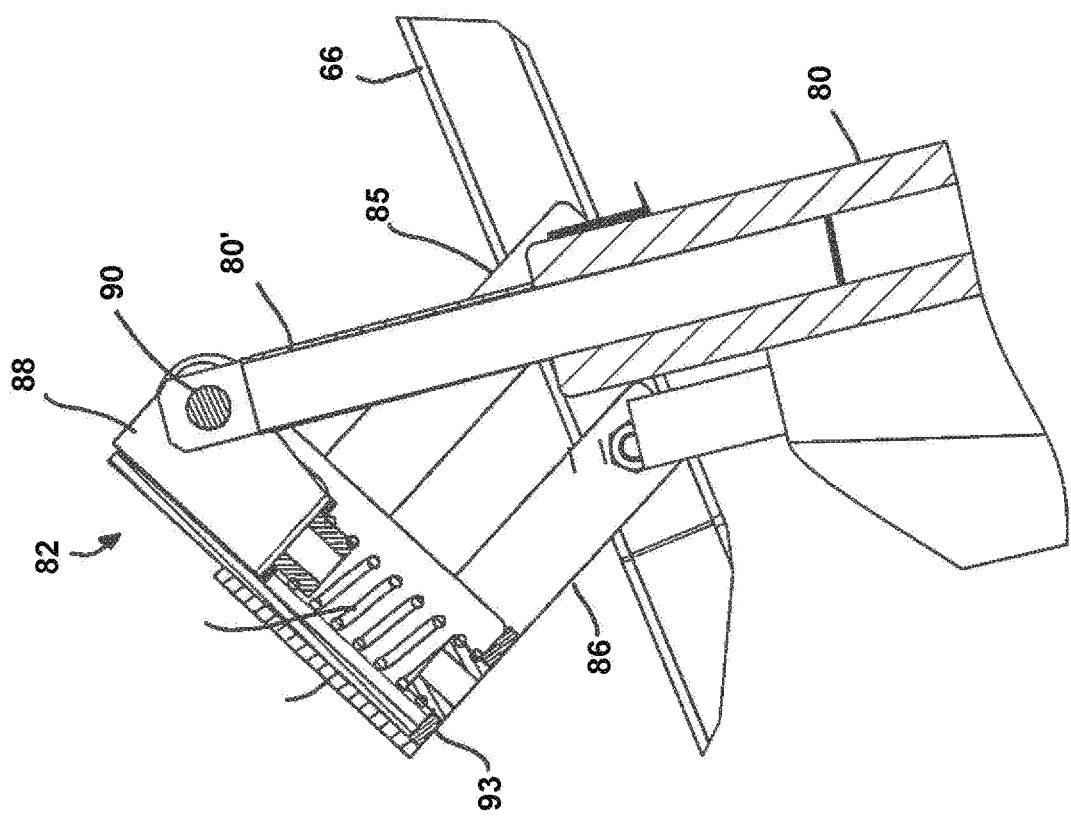

With reference to FIGS. 13A and 13B, the lift actuator 80 is connected to the upper link arm 66 by a yieldable downforce regulating device 82. The downforce regulating device 82 comprises a housing element 84 which is fixed to the upper link arm 66 by a pair of bracket arms 85, 86. The bracket arms 85, 86 may be secured to the upper link arm 66 and the housing element 84 by any suitable fixing means such as bolts or welding. A sliding element 88 is retained by the housing 84 with freedom to move along an elongate axis of the housing element 84 within a movement range determined by a retaining pin 90 held within an elongated slot 89 provided by the housing element 84. A piston rod 80' of lift actuator 80 is pivotally connected to the sliding element 88 by the pin 90. A coil spring 92 is retained in the housing element 84 between an end wall 93 (welded to the housing element 84) and the sliding element 88. The spring 92 presents a biasing force against the sliding element 88, biasing the sliding element towards a distal end of the slot 89.

As the opening device 60 is moved into a raised position (FIG. 13A), the lift actuator 80 extends and permits the spring 92 to expand and push the sliding element 88 until it reaches the distal end of travel in the slot 89, whereupon further extension of the lift actuator 80 raises the opening device 60 from the ground. When lowering the opening device 60 to a lowered position (FIG. 13B), the lift actuator is retracted until the upward force exerted by the ground surface upon the opening device 60 exceeds the biasing force of the spring 92, whereupon further retraction of lift actuator 80 causes the spring 92 to compress and generate a downforce pressure. In operation therefore, the opening device 60 may ride over stones and hard regions by acting against the biasing force of the spring 92. As such, the position of the pin 90 in the elongate slot 89 is proportional to the downforce applied to the opening device 60.

The downforce regulating device 82 enables to apply a force on the opening device 60 independent of the actuator 80 which is locked in position during seeding. This enables a smooth ride and depth control.

'Pushed' Opening Device

Figure 6A:
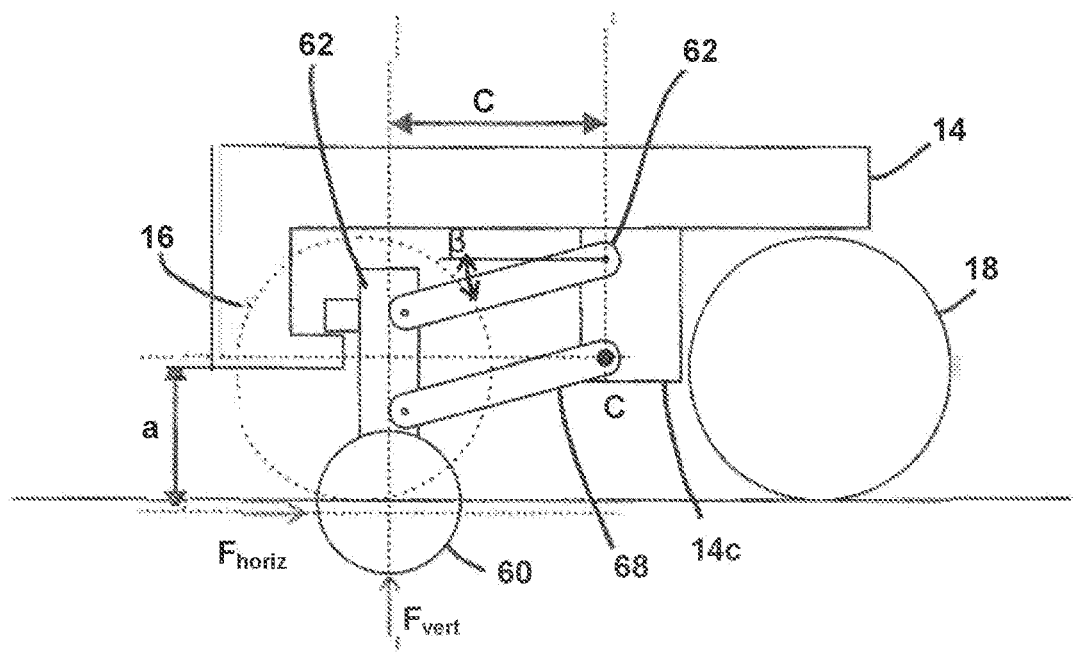
FIGS. 6A and 6B are each schematic vertical center-line sections viewed from the left side illustrating the various forces acting upon the opening device during operation with FIG. 6B showing the opening device at a greater depth than shown in FIG. 6A.

The opening device 60 is pushed through the soil when in a lowered position and typically at a depth extending below the ground surface. With reference to FIG. 6A, the force required to push the opening device into the ground $F_{vert}$ is derived from torque balancing with the horizontal force $F_{Horiz}$ created by the driven ground-engaging wheels 15, 16, 18. The depth control means 96 prevents the opening device 60 from digging too deep and the getting stuck.

Figure 6B:
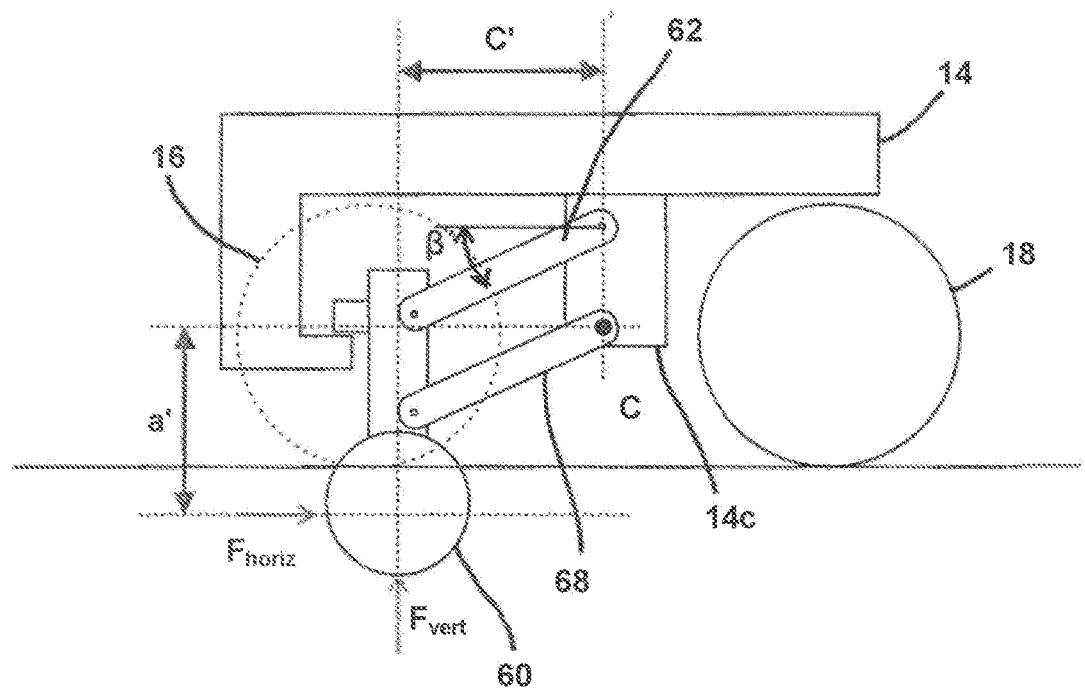

As the length of the upper and lower link arms 66, 68 is limited by the overall length constraints of the robot 10, the angle β between the linkage and the ground should be as large as is practically possible in order to maximize the torque, resulting from the force $F_{vert}$, which pushes the opening device 60 into the ground. As shown in FIG. 6B, increasing angle β' would result in virtual lever arm a' being greater compared virtual lever arm a (for angle β in FIG. 6A). Furthermore virtual lever arm c' is reduced compared to virtual lever arm c (for angle β in FIG. 6A), the torque increased with constant horizontal force $F_{Horiz}$ would result in increased $F_{vert}$, which pushes the opening device 60 into the ground. The torque resulting from the resistance force of the soil $F_{vert}$ also decreases, which helps to push the opening device 60 easier into the ground. But this method is limited by the overall weight of the robot 10 because the total weight always gets spread into a traction part and a downforce part. If the resistance of the soil gets bigger than the downforce part of the robot weight, the opening device and the robot are pushed upward.

As a result of the disclosed architecture, better depth control quality is achieved without a requirement for a special minimum weight of the seeding unit itself, because for short time periods this mechanism transfers the vertical force with the help of the kinetic energy of the total robot to the opening device. This makes a light robot more suitable for changing soil conditions.

Furthermore, this helps to provide an optimized distribution of the traction force portion and the downforce force portion.

Steering 'Press' Wheel 18

Figure 5C:
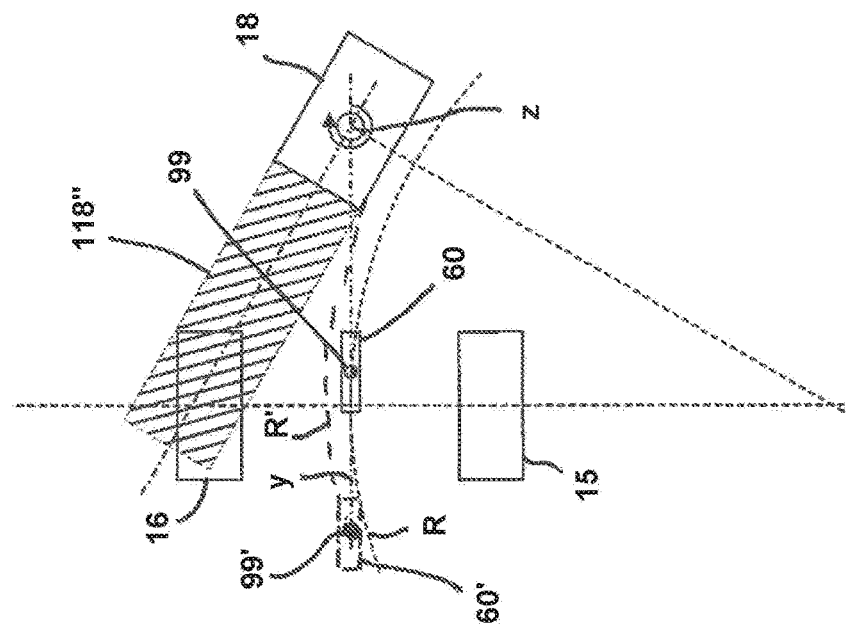
FIGS. 5A to 5C illustrate in plan view the projected footprint of the steerable trailing wheel of a seeding robot in accordance with an embodiment of the invention for different steering angles.
Figure 5B:
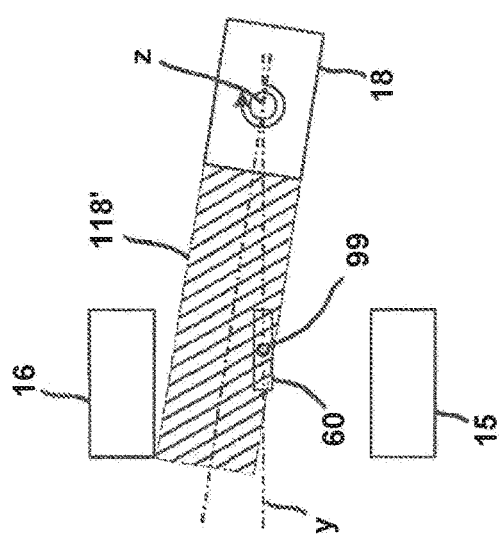
Figure 5A:
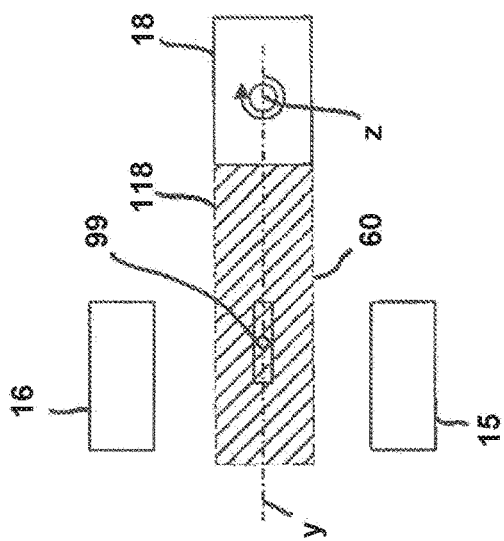

In some embodiments, and with reference to FIGS. 5A through 5C, the steerable trailing wheel 18 is positioned behind and aligned on a longitudinal axis y (FIG. 3) with the seed opener 60 and seed dispense point 59. When travelling in a straight forward direction of travel as indicated in FIG. 5A, the footprint 118 of the trailing wheel 18 passes over the seed dispense point 59. Advantageously, the trailing wheel 18 thereby serves as a press wheel to increase seed-to-soil contact and avoids the need for a further pass with a machine for pressing. As such, the weight of the robot 10 is used to perform a pressing function.

The steering of wheel 18 may be controlled by the CPU 32 to restrict the steering angle during a seeding operation to ensure that the footprint 118 thereof passes over the seed dispense point 59. In a first steering mode in accordance with one embodiment, the steering angle is restricted within a steering angle range, one limit of which is illustrated in FIG. 5B. In this first steering mode, the maximum steering angle is limited to a relatively shallow steering angle $\omega_1$ whereby the footprint 118' of the trailing wheel 18 still coincides with the seed dispense point 59 and performs the aforementioned pressing function.

In a second steering mode, the steering angle is either unrestricted or restricted within a steering angle range that is greater than that set for the first steering mode. Such wider steering angles may, for example, be used when not seeding (for example when turning on the headland) or when the press function is not essential. FIG. 5C shows the footprint 118" of the trailing wheel 18 for a relatively large steering angle $\omega_2$ which does not coincide with the seed deposited at dispense point 59.

As best seen in FIG. 5C, by positioning seed opener 60 (in longitudinal axis y) between the steerable trailing wheel 18 and leading wheels 15, 16 on longitudinal axis y, when passing a curve the seed opener 60 drives on a radius indicated with R which is close to the longitudinal axis y and close to tangential. If the seed opener 60 was otherwise positioned in front of the leading wheels 15, 16 lateral forces would increase mechanical loads on seed opener 60 and linkage 64 and reduce efficiency as lateral forces must be compensated by horizontal force $F_{Horiz}$ created by the driven ground-engaging wheels 15, 16, 18.

From reading the present disclosure, other modifications will be apparent to persons skilled in the art. Such modifications may involve other features which are already known in the field of seeding apparatus and component parts thereof and which may be used instead of or in addition to features already described herein.

The invention claimed is:

1. A seeding apparatus configured to move in a forward direction, the seeding apparatus comprising:
   a frame supported on ground-engaging wheels;
   an opening device for creating a trench, wherein the opening device comprises a support structure and a pair of mutually angled coulters rotatably mounted to the support structure, wherein the opening device is mounted to the frame by a four-bar linkage comprising first and second link arms, wherein each of the first and second link arms is pivotably connected to the frame at respective first and second pivot joints, and to the support structure of the opening device at respective third and fourth pivot joints disposed forward of the first and second pivot joints in the forward direction;
   a seed reservoir; and
   a seed dispensing apparatus configured to deposit seed in the trench.

2. The seeding apparatus of claim 1, further comprising a depth-control stop mounted to the frame and configured to contact and limit downward travel of the opening device.

3. The seeding apparatus of claim 2, wherein a position of the depth-control stop is adjustable with respect to the frame.

4. The seeding apparatus of claim 1, further comprising a lift actuator connected between the frame and the first link arm, wherein the lift actuator is operable to raise and lower the opening device.

5. The seeding apparatus of claim 4, wherein the lift actuator is connected to the first link arm at a position intermediate the first and third pivot joints.

6. The seeding apparatus of claim 1, further comprising a closing device positioned behind the opening device.

7. A seeding robot comprising a power supply and the seeding apparatus of claim 1.

8. A seeding apparatus configured to move in a forward direction, the seeding apparatus comprising:
   a frame supported on ground-engaging wheels;
   an opening device for creating a trench, wherein the opening device is mounted to the frame by a four-bar linkage comprising first and second link arms, wherein each of the first and second link arms is pivotably connected to the frame at respective first and second pivot joints, and to the opening device at respective third and fourth pivot joints disposed forward of the first and second pivot joints in the forward direction;
   a seed reservoir;
   a seed dispensing apparatus configured to deposit seed in the trench; and
   a lift actuator connected between the frame and the first link arm, wherein the lift actuator is operable to raise and lower the opening device, wherein extension of the lift actuator raises the opening device.

9. A seeding apparatus configured to move in a forward direction, the seeding apparatus comprising:
   a frame supported on ground-engaging wheels;
   an opening device for creating a trench, wherein the opening device is mounted to the frame by a four-bar linkage comprising first and second link arms, wherein each of the first and second link arms is pivotably connected to the frame at respective first and second pivot joints, and to the opening device at respective third and fourth pivot joints disposed forward of the first and second pivot joints in the forward direction;
   a seed reservoir;
   a seed dispensing apparatus configured to deposit seed in the trench; and
   a lift actuator connected between the frame and the first link arm, wherein the lift actuator is operable to raise and lower the opening device, wherein the lift actuator is connected to the first link arm by a yieldable down-force regulating device.

10. The seeding apparatus of claim 9, wherein the down-force regulating device comprises a spring inside a spring housing, wherein the spring is configured to act between the spring housing and the lift actuator, wherein the spring housing is fixedly connected to the first link arm, and wherein the lift arm is operable to compress the spring when downward travel of the opening device is restricted.

11. A seeding apparatus configured to move in a forward direction, the seeding apparatus comprising:
   a frame supported on ground-engaging wheels;
   an opening device for creating a trench, wherein the opening device is mounted to the frame by a four-bar linkage comprising first and second link arms, wherein each of the first and second link arms is pivotably connected to the frame at respective first and second pivot joints, and to the opening device at respective third and fourth pivot joints disposed forward of the first and second pivot joints in the forward direction;
   a seed reservoir; and
   a seed dispensing apparatus configured to deposit seed in the trench;
   wherein the seed dispensing apparatus is configured to deposit seed in the trench from a dispense point, and wherein the seeding apparatus further comprises a pair of driven leading wheels which are laterally offset to opposite sides of the dispense point, and a steerable trailing wheel positioned behind, and aligned on a longitudinal axis with, the dispense point when the seeding apparatus moves in the forward direction.

\* \* \* \* \*